United States Patent Office 3,321,739
Patented May 23, 1967

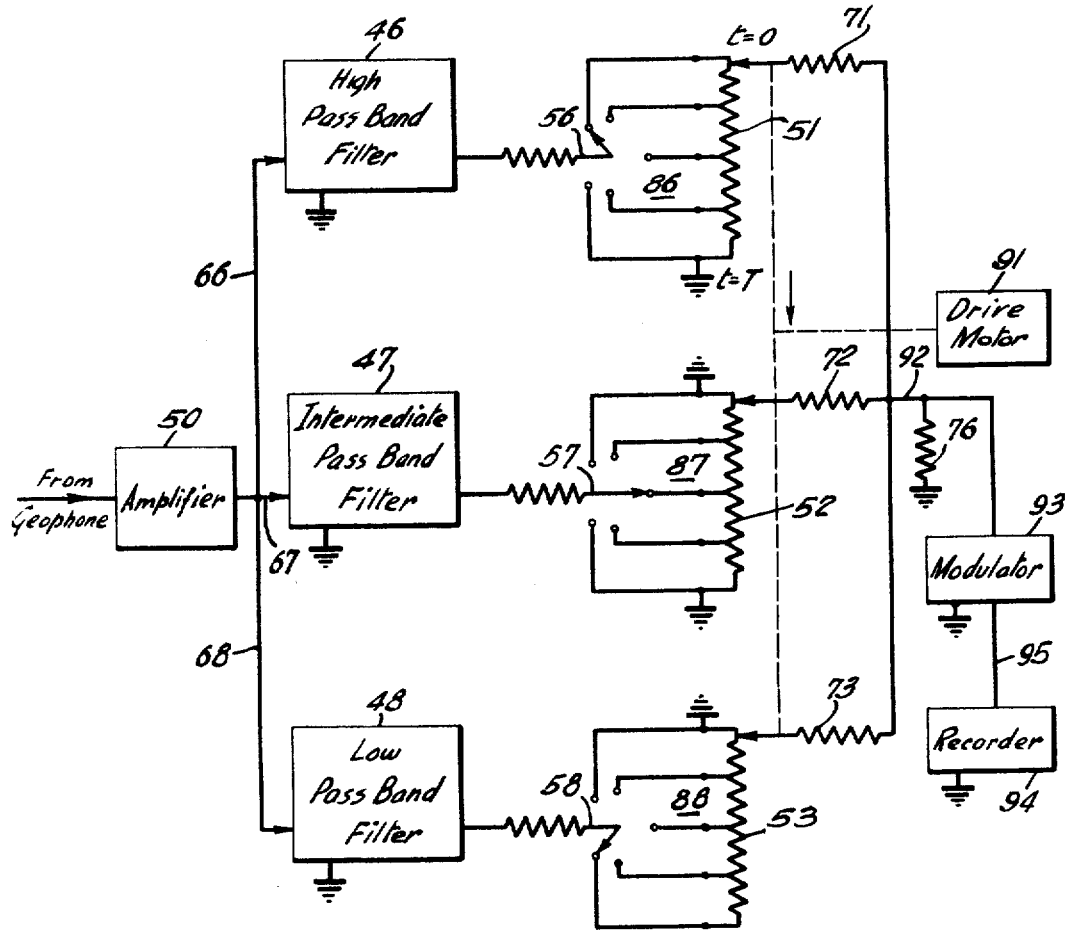

3,321,739
SEISMIC SIGNAL PROCESSING SYSTEM EMPLOY-
ING CONTINUOUS MIX OF FILTERED SIGNAL
Burton D. Lee, Houston, Tex., assignor to Texaco Inc.,
New York, N.Y., a corporation of Delaware
Filed June 2, 1964, Ser. No. 372,009
11 Claims. (Cl. 340—15.5)

This invention relates to a seismic exploration system, and more particularly, to a method and apparatus for providing time-varying filtering of the signals to be recorded in a seismic survey.

Seismic exploration of an area of interest is carried out by inducing elastic or seismic waves at a location in the earth known as a shot point by means of an explosion or heavy impact such as might be obtained by the dropping of a heavy weight, and detecting the induced seismic waves and their reflected components which are received from a reflecting boundary or interface below the earth's surface. The received seismic waves are converted by means of an array of transducers or geophones into electrical signals which are usually amplified, filtered and recorded. The recording traces or seismogram contains information on the location and character of subsurface strata within the area of exploration.

It has been observed that the higher frequency seismic waves are attenuated to a greater degree than those of a lower frequency when traveling in the earth. Accordingly, the signals in the earlier portions of a seismogram, representing seismic waves received from closer underlying reflecting boundaries, will be characterized by having a larger proportion of high frequencies than those signals caused by waves reflected from deeper underlying reflecting interfaces. The desired seismogram, therefore, would be one in which low frequency signals are emphasized less than the high frequency signals during the first portion of the record, an intermediate emphasis of both the high and low frequency signals during the middle portion of the record and a greater emphasis of the low frequency signals than the high frequency signals during the end portion of the record.

In accordance with the present invention, a system is provided by means of which the proportions of signals obtained from different frequency ranges may be varied as a function of time along the seismic record.

In different cases, it is desired to provide seismograms having variable amplitude versus time characteristics for signals obtained from predetermined frequency ranges. By the correct variation of amplitude with time, reflected information as recorded on the seismogram can be more easily distinguished and therefore, the seismic information obtained is more valuable than in the absence of the present invention.

It is has been found that varying filter components directly with respect to time causes changes of insertion loss and thus changes in channel gain which are particularly unacceptable in seismic exploration. A known solution to the problem has been to obtain filtering variations indirectly by varying the gain of an amplifier associated with the particular filter as a function of time. Thus, if filters of different pass-bands are arranged in parallel channels to apply filtering to seismic signals, an individual amplifier must be associated with each of the filters. The signals from the filters must then be mixed and recorded to give the resulting seismic trace.

According to the present invention, there is provided a source of seismic energy, such as a shot which when exploded at a shot point, causes seismic signals to be introduced into the earth. After reflection within the earth, the seismic signals are received by a geophone and converted into corresponding electric signals. Each of the electric signals is applied to a plurality of separate, parallel channels each of which contains a filter means which is adjusted to pass signal frequencies in a predetermined frequency range. The outputs of the parallel channels are mixed in proportions which vary as a function of time and are then recorded so as to provide a record which contains time variable filtering. For example, at the beginning of a seismogram, it may be desired to have signals recorded which are mixed from the respective frequency ranges so that substantially 100% of the signal output from a channel which passes signals lying in a high frequency range is mixed with substantially 0% of the signal output from a channel passing signals lying in a low frequency range. Also, as the end of the seismogram is approached, it may be desired to reverse the proportions so as to obtain a record in which substantially 100% of the signal output from the low frequency passing channel is recorded. Depending on the case, variations of the above variable ratio of mixing may be obtained.

Accordingly, it is an object of the invention to provide an improved seismic exploration system.

It is another object of the invention to provide a seismic exploration system in which the electrical variations lying within predetermined frequency regions are mixed in proportions which vary with respect to time.

It is a further object of the present invention to provide a seismic exploration system in which a time varying filter effect is provided without the necessity for varying the gain of associated amplifiers with time.

It is a further object of the invention to provide a seismic exploration system having a time variable filter system which passes more frequency signals of one value than frequency signals of another value during the first portion of a record, reverses the proportions of the frequency signals during the end portion of the record and varies the proportions of the different value frequency signals during an intermediate portion of the record.

It is another object of the invention to provide a seismic exploration system in which signals from predetermined frequency ranges are mixed in proportions which vary linearly with time.

It is a further object of the invention to provide a seismic exploration system in which signals from predetermined frequency ranges are mixed in proportions which vary logarithmically with time.

It is another object of the present invention to provide a seismic exploration system in which the time variation of the proportions of the signals to be mixed from the predetermined frequency ranges may be arbitrarily programmed.

In order to describe the invention in more detail, reference will now be made to the figures of the accompanying drawings.

FIGURE 8 is a partially schematic circuit diagram showing the connections for a special case of the proportioning and mixing of the outputs from a three filter channel arrangement as shown in FIGURE 7.

Figure 1:
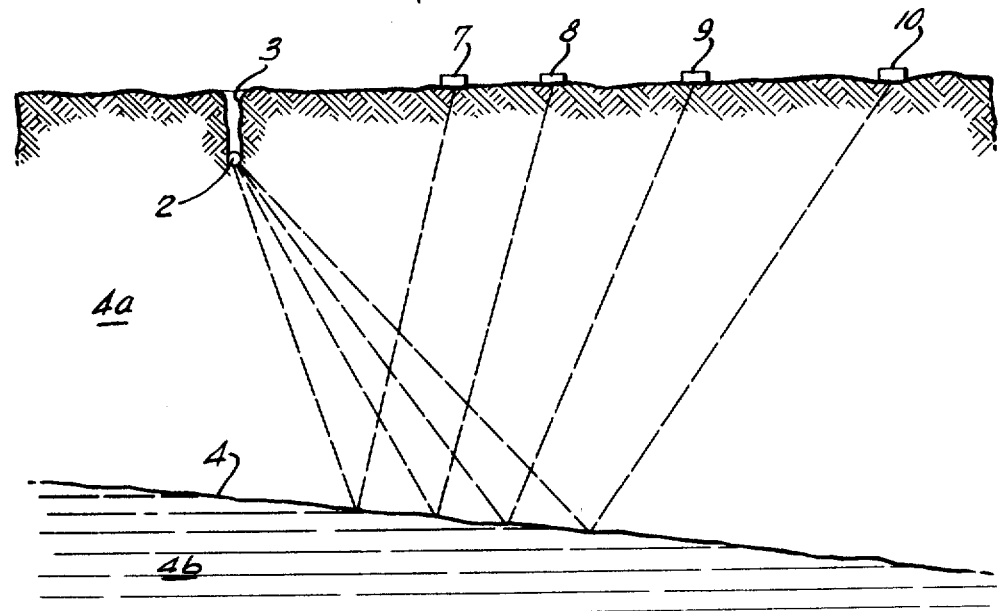
FIGURE 1 is a schematic diagram taken as a cross-section of a bit of the earth's surface, and illustrating the paths of travel of seismic waves.

In FIG. 1, there is illustrated a simplified diagram of seismic waves and their reflected components in a seismic exploration system. An explosive charge 2 is positioned within a shot hole 3 which when detonated results in vibrations being transmitted outward therefrom in all directions. A plurality of vibration pickup seismometers 7, 8, 9 and 10 are positioned at or near the surface in a predetermined geometric array. In the illustrated example, vibrational waves of interest travel downward from explosive charge 2 and are reflected upward from reflecting interface 4 between adjacent formations 4a and 4b to the several seismometers 7–10. It should be apparent from the figure that these reflected waves arrive at the four seismometers at slightly different times. This difference in time between actuation of the several seismometers is due to the difference in the length of paths traveled by the several reflected waves downward from charge 2 to interface 4 and back upward to the surface. This time interval is, therefore, a definite function of the depth and dip of interface 4 and the geometric arrangement of the several interface 4 and the geometric arrangement of the several seismometers at the surface. By measuring the times of arrival of the reflected signals at the different seismometers, the depth and dip of interface 4 can be determined if the velocities of the seismic waves in the various formations between the surface and interface 4 are known.

For purposes of determining the time of arrival of the reflected waves at the several seismometers, it is conventional to record the vibrations picked up at these seismometers by suitable electrical equipment. The recording apparatus can be arranged to begin recording at the time of the detonation of charge 2 so as to establish a zero or common reference time. By recording the vibrations from the several seismometers side by side on a common recording medium, it is sometimes possible to obtain the time of arrival of the reflected waves by direct observation of the recorded traces. However, very often the reflected waves are obscured by vibrations caused by well known surface waves, refracted waves and other more or less random waves which are generated by the detonation of explosive 2. The presence of these stray vibrations super-imposed upon the desired reflected signal tends to complicate the problem of distinguishing the reflected waves to determine the exact time of arrival thereof.

Figure 2:
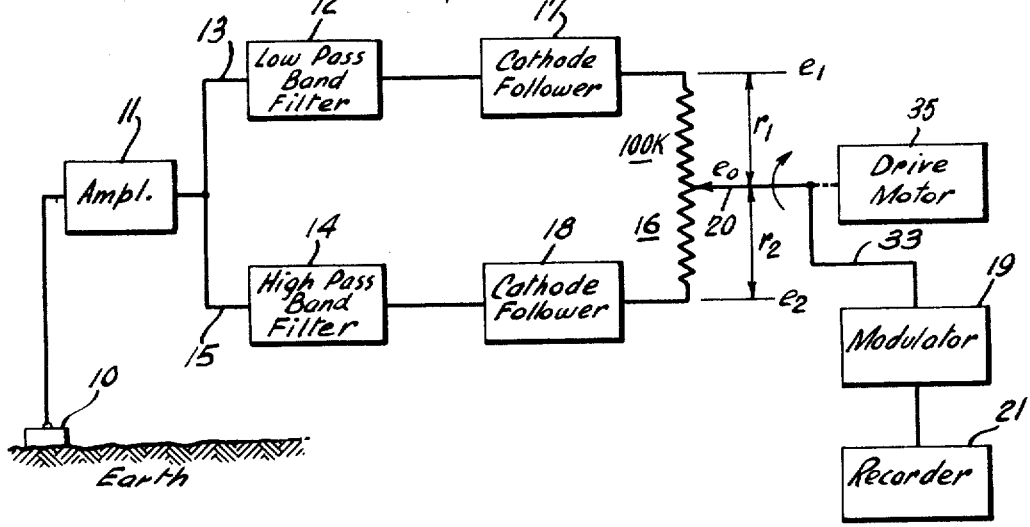
FIGURE 2 illustrates schematically and by block diagram the seismic exploration system of the present invention including a time-variable filter system.

Referring to FIG. 2, the electrical equipment used in converting the seismic signals into electrical signals and recording the same is shown. It will be appreciated that the electrical equipment for handling the electrical signals from each seismometer is the same. Accordingly, only the electrical equipment associated with one of the seismometers is shown and described. The electrical signals obtained from the seismometer, such as seismometer 10, are amplified in amplifier 11 and applied to parallel channels 13 and 15 which include a low pass-band filter 12 and a high pass-band filter 14, respectively. The filters 12 and 14 may be of any conventional design and are adjusted to provide passage of signals in predetermined frequency ranges only. For example, the high pass-band filter 14 in channel 15 may be adjusted to have a bandpass of 50 to 150 cycles per second and the low pass-band filter 12 may be adjusted to have a band-pass of 30 to 70 cycles per second. The filters 12 and 14 should have a portion of their frequency range which overlaps substantially. It should be noted that the frequencies in the above example, overlap between 50 and 70 cycles. If no overlap is provided, the transition from one filter function to the other might result in a dead section in the record.

For varying the ratio in which the signals from each of the channels 13 and 15 are to be mixed, a voltage divider such as a potentiometer 16, having a value for example 100K, is provided to the ends of which the outputs from the filters 12 and 14 are connected, respectively, through conventional cathode follower circuits 17 and 18 which comprise means for matching impedances.

The potentiometer 16 is preferably of the rotary type. The wiper 20 for the potentiometer is driven by a drive motor 35. It will be appreciated that the drive for the wiper 20 of a rotary potentiometer may be conveniently obtained from the drive of the recorder 21, since the sweep time of the potentiometer should bear a known relationship and, for example, may correspond exactly to the time it takes the record event to pass.

Figure 4:
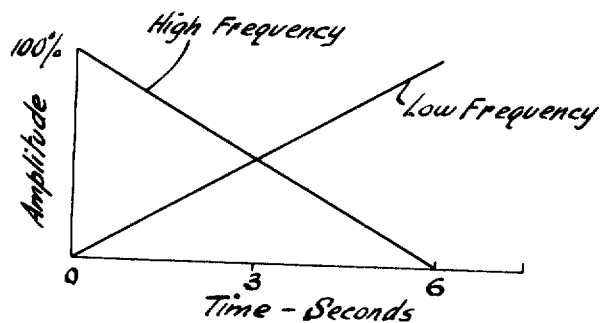
FIGURES 4, 5 and 6 are explanatory curves referred to in the discussion of FIGS. 2 and 3.

In the case where a linear potentiometer is provided, the proportions in which the outputs of filters 12 and 14 are mixed, also vary linearly. This can be seen by referring to FIG. 4 which is a plot of amplitude versus time which is effectively a plot of the variations in proportions of the outputs of filters 12 and 14 which are provided by a linear potentiometer such as potentiometer 16 with respect to time. Considering the sweep time of wiper 20 to be six seconds, it may be observed that at the start of the sweep when the wiper is adjacent the end of the potentiometer winding to which the output of filter 14 is connected, substantially 100% of the amplitudes of the output signals of this filter are obtained on the record as a result of the mixing. At the same time, the proportion of the output from filter 12, the low pass filter, which is mixed, is substantially zero. As the potentiometer wiper 20 is swept toward the other end of the potentiometer winding, the proportions of the outputs of filter 14 (the high pass filter) and filter 12 (the low pass filter) which are mixed linearly decrease and increase, respectively. At the end of the record corresponding, for example, to a six second passage of time, substantially 100% of the output of the low pass filter 12 will be mixed with substantially 0% of the high pass filter 14. Thus, a complete sweep of the wiper of a linear potentiometer provides substantially a complete filtering out of the low frequencies at the beginning of the record and a substantially complete filtering out of the high frequencies at the end of the record with a linearly varying filtering out of both high and low frequencies in between. The output of the potentiometer, which consists of the combined proportions of the electric signals from the filters determined by the potentiometer, is, of course, obtained from the wiper 20 thereof. The wiper is connected to the modulator 19 by an electrical connection 33.

Referring to FIG. 2 a mathematical expression of the mixing obtained using a potentiometer as described above can be defined as follows:

$$e_0 = e_2 + \frac{r_2}{r_1 + r_2}(e_1 - e_2)$$

defining:

$$\frac{r_2}{r_1 + r_2}$$

as being equal to $f$ then: $e_0 = e_2 + fe_1 - fe_2 = fe_1 + (1-f)e_2$ where:

$e_0$ = voltage output
$e_1$ = voltage input from low pass channel
$e_2$ = voltage input from high pass channel
$r_1$ = resistance between $e_1$ and $e_0$
$r_2$ = resistance between $e_2$ and $e_0$
$f$ = fraction as defined The above derived expression is a way of expressing a "weighted average" of $e_1$ and $e_2$.

In the case of a linear potentiometer, during the sweeping of the winding, the high frequency signals are included in the weighted average with a weighting factor that starts large and then diminishes linearly with time while the low frequency signals are included with a weighting factor that starts small and then increases linearly with time.

If a logarithmic potentiometer is utilized, that is one which is wound so as to produce an output which varies logarithmically as the winding is swept by the wiper, the same results are obtained as described above except that the proportions which are mixed vary logarithmically with respect to time rather than linearly. It will be appreciated that the invention is not limited to a linear or logarithmic function but is capable of producing nearly any arbitrary function depending on the manner in which the potentiometer is wound and by proper use of external shunting resistors between taps on the potentiometer. For example, by shunting two adjacent taps the rate of change can be held to zero between the two.

Modulator 19, which receives the output obtained from wiper 20 of potentiometer 16, may be of any conventional design. The mixed and modulated signals are applied to recorder 21, which may be any recorder of the type used for recording seismic signals. The trace or seismogram obtained using the above system of varying with time the mixing proportions of the signals from predetermined frequency ranges to provide the time variable filter system provides accentuation of the information about depths and contours of the strata in the earth in the area being explored.

It will be appreciated that the electrical signals do not have to be obtained from the geophones directly but can be obtained from a field tape on which the electrical signals from geophones have been prerecorded. This would require, as can be seen from FIG. 3, a demodulator 23 to remove the modulation introduced for recording the original electrical signals.

Figure 3:
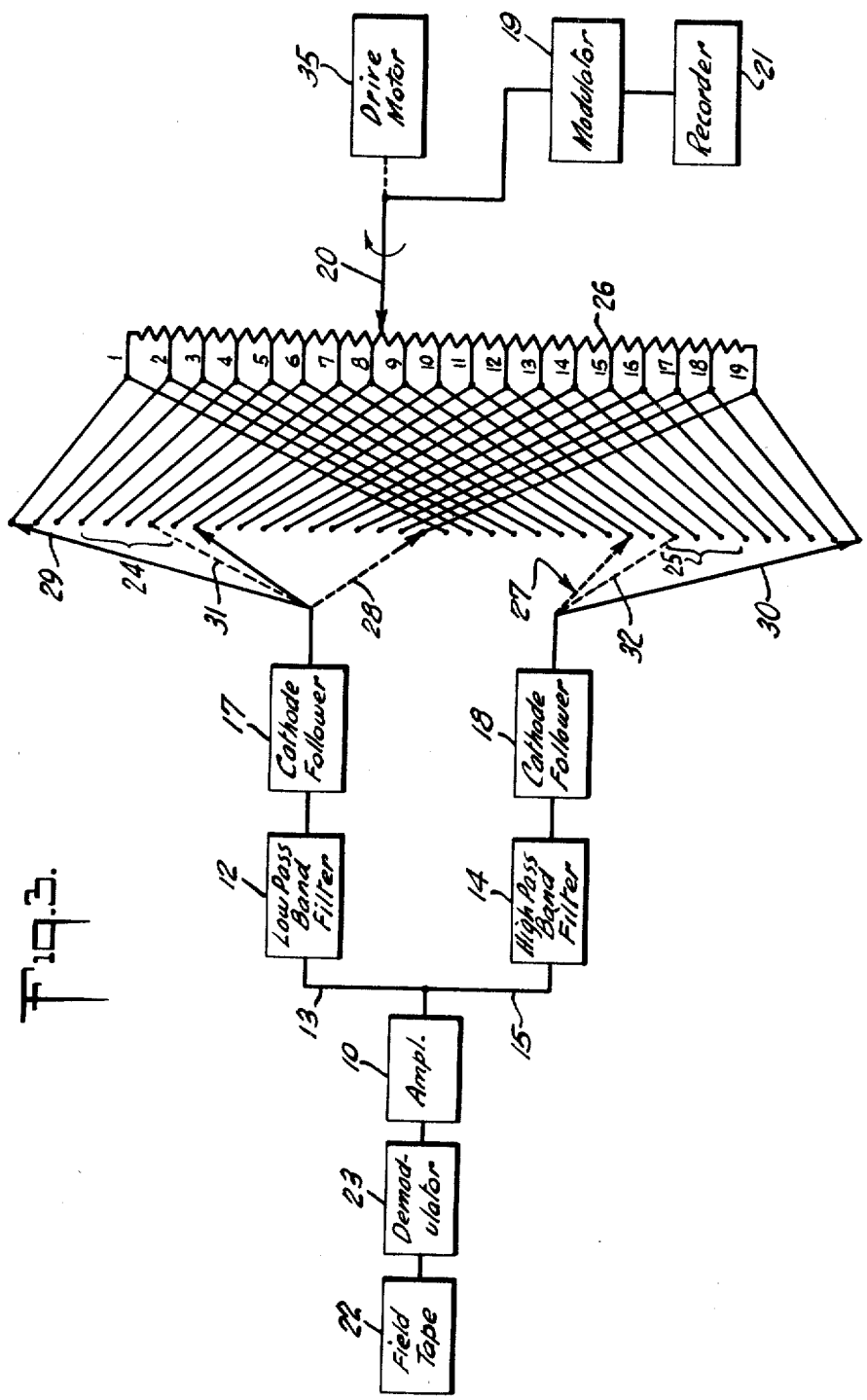
FIGURE 3 is a further partial schematic and block diagram of a seismic exploration system showing a further improvement in the time-variable filter system.
Figure 5:
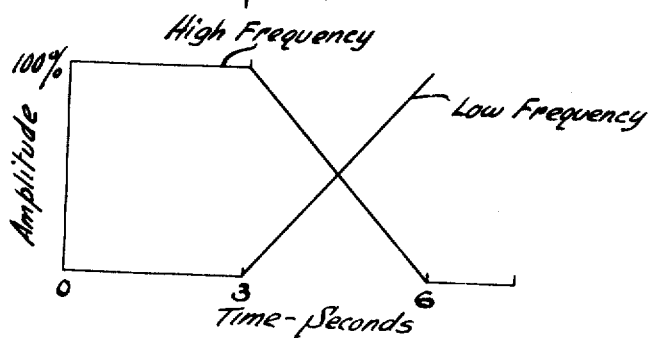
Figure 6:
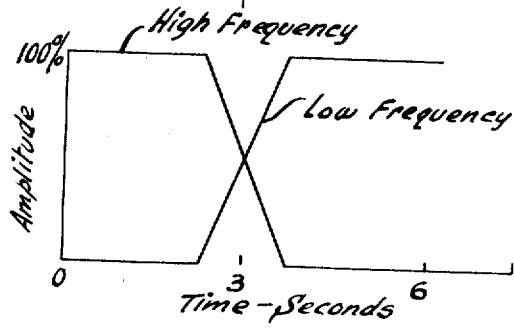

A modification of the invention is shown in FIG. 3, taken in conjunction with the curves plotted in FIGS. 5 and 6. The parts of FIG. 3 which correspond to those of FIG. 2 are designated by the same reference numerals. Switches 24 and 25 are shown connected in channels 13 and 15, respectively. Each of the switches 24 and 25 are of the rotary type and have in the embodiment depicted in FIG. 3, 19 switch positions. This corresponds to the two end positions and 17 additional taps on the potentiometer 26 as schematically represented in FIG. 3. It will be appreciated that connecting switch 24 to the number one position on the potentiometer 26 as shown by solid line 29 and connecting switch 25 to position 19 on the potentiometer 26 as shown by solid line 30 will give the same results as is obtained with potentiometer 16 of FIG. 2, viz., the curves plotted in FIG. 4. By connecting the outputs from filters 12 and 14 to different tap positions of the potentiometer by means of switches 24 and 25, control is obtained of the manner in which the ratio of mixing of the output signals from filters 12 and 14 is varied with time. Referring to FIG. 5, an amplitude versus time plot of the outputs of filters 12 and 14 as they are mixed is depicted for the switch settings shown by solid line 29 and dashed line 27 on FIG. 3. It can be seen that substantially 100% of the output of the high pass band filter 14 would be recorded as a result of the mixing during the zero to three second time (i.e., half the total sweep time) when the potentiometer wiper 20 is sweeping the portion of the potentiometer from tap 19 to tap 9 where the output of filter 14 is connected. The resistance portion before tap 9 swept by the potentiometer wiper 20 has little effect on variations of the mixing ratio since there is a rather large output impedance and correspondingly very little current flow. The voltage at all points along this resistance portion remains substantially constant during this first half of the total sweep and accordingly, the mixing ratio remains substantially constant as can be seen from examination of FIG. 5. Likewise, both the low band-pass filter 12 output and the high band-pass filter 14 output can be switched to intermediate tap positions of the potentiometer 26 as shown by dashed lines 31 and 32 on FIG. 3 to obtain a somewhat similar control over the time during which the mixing ratio is variable, as can be seen from the plot in FIG. 6 of the proportions of the low and the high band-pass filter outputs being mixed.

The invention effectively provides time-variable filtering without at the same time affecting amplifier gain and without time varying the band-pass filters directly. This is accomplished by varying the mixing ratio of the filter outputs as a function of time. As a result of this invention, the information recorded in a seismic survey can be more readily interpreted.

The invention is not necessarily limited to the two channel embodiments disclosed above but may be practiced using a number of filter channels, the outputs of which are mixed in a ratio which is variable as a function of time and recorded.

Figure 7:
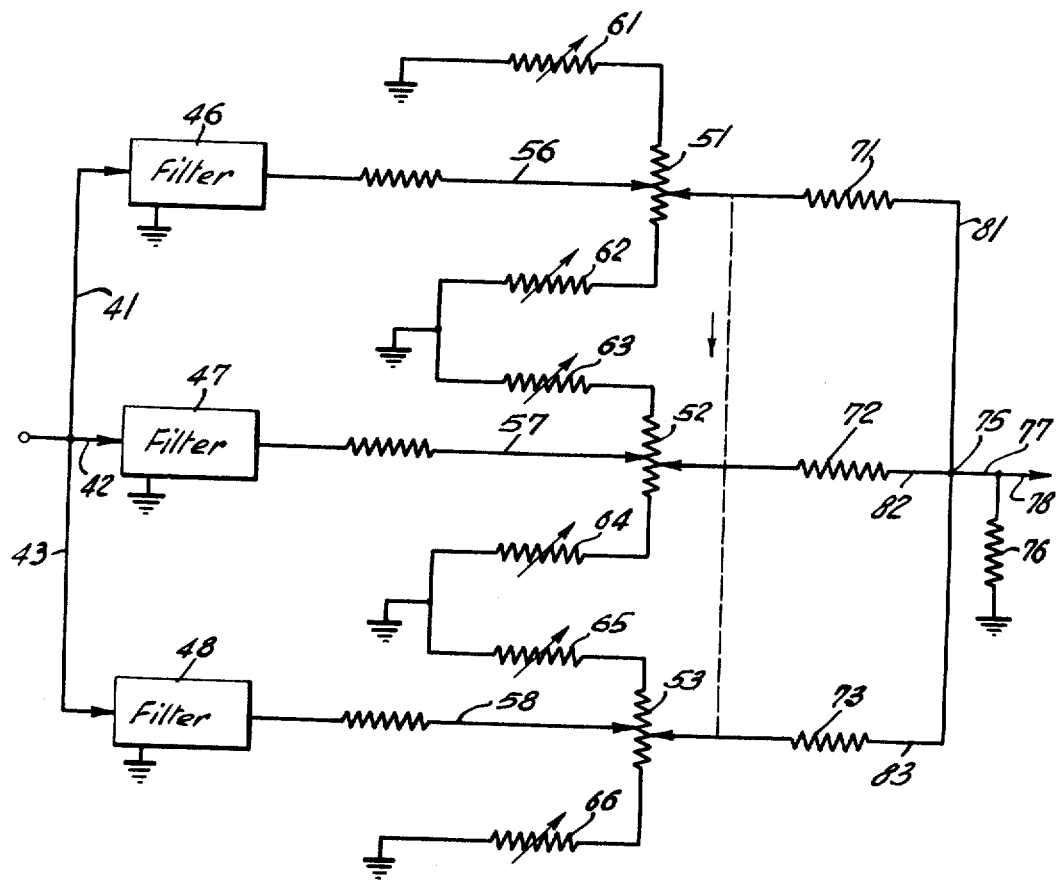
FIGURE 7 is a partial schematic circuit diagram showing three filter channels including means for proportioning and mixing the outputs thereof.

FIG. 7 shows a general case of three channels in a time variable filter system each containing a filter, combining means and variable proportioning means so arranged as to provide a predetermined proportional mixing of the outputs from each of the filters as a function of time. The electrical signals, as mentioned previously, may be derived from a geophone directly or from a tape recording of the geophone signals. The electrical signals are applied over electrical connections 41, 42 and 43 to filters 46, 47 and 48, respectively. The filters may have any predetermined pass band characteristics. The outputs from filters 46, 47 and 48 are applied to potentiometers 51, 52 and 53 via electrical leads 56, 57 and 58. respectively. It will be noted that the electrical leads 56, 57 and 58 are shown connected to the potentiometers 51, 52 and 53 schematically so as to indicate that the connections are variable with respect to the potentiometers. That is, the electrical connectors 56, 57 and 58 may be connected to a predetermined tap position on their respective potentiometers. Each end of potentiometers 51, 52 and 53 are connected to ground through variable resistors 61 through 66, respectively. Each of these variable resistors 61-66 may be preset to introduce resistance ranging from infinity to zero. That is, the variable resistors can each be preset to such a high value that it is effectively an infinite resistance with respect to the rest of the circuit. Likewise, the resistance may be varied so as to provide a negligible or zero value. It will be appreciated that variable resistors 61-66 provide a further control over the proportions of the filter outputs to be mixed, for example, if variable resistor 61 is set to its maximum value (effectively infinity) and variable resistor 62 is set to its negligible or zero value then potentiometer 51 is capable of passing substantially the full amplitudes of the outputs of filter 46 at the beginning of the sweep of potentiometer 51 as well as passing none of the output from filter 46 at the end of the sweep. It will be further appreciated that the electrical connectors 56, 57 and 58 afford a further control over the respective filter outputs 46, 47 and 48 depending on where they are connected to the respective potentiometers. It can be seen that the potentiometers 51, 52 and 53 have their wipers mechanically connected together so as to sweep across the potentiometer windings in synchronism from top to bottom as depicted by the arrow in FIG. 7. These potentiometers are the same as the potentiometer described in the prior embodiment which may be of the rotary type and accordingly can be driven by a simple drive motor preferably by the drive means of the recorder. Resistors 71, 72 and 73 are provided for the purposes of isolation. The signals resulting on each of the wipers of potentiometers 51, 52 and 53 are connected via leads 81, 82 and 83, respectively, to point 75 which is connected to one end of summing resistor 76 by lead 77. The other end of summing resistor 76 is connected to ground. The output voltage taken across summing resistor 76 is the summation of the inputs to point 75 and accordingly, the outputs from the potentiometers are mixed. The output 78 is a signal containing varying proportions of the filter outputs, the proportions being determined by the time variable system described above.

Referring to FIG. 8, there is shown a specific case of the general arrangement shown in FIG. 7. This specific case could be obtained in the general arrangement of FIG. 7 by setting variable resistor 61 to its highest value which may be effectively infinite value and setting variable resistor 62 to its lowest value which may be effectively zero value. Also, variable resistor 63 would be set to its lowest or effectively zero value, resistor 64 would be also set to its effectively zero value, resistor 65 would be set to its effectively zero value and resistor 66 would be set to its highest or effectively infinite value. Furthermore, the outputs would have to be connected to the top, middle and bottom of potentiometers 51, 52 and 53, respectively.

In the specific case depicted by FIG. 8, electrical connectors 56, 57 and 58 are shown connected to their respective potentiometers 51, 52 and 53 by means of multiposition switches 86, 87 and 88, respectively. It can be seen that each switch setting connects the filter output to a separate tap along the respective potentiometer. As mentioned previously, this provides a further control over the proportions in which the filter outputs are mixed. The particular switch settings in this specific arrangement are switch 86 connected to the top tap of potentiometer 51, switch 87 connected to the middle tap of potentiometer 52 and switch 88 connected to the bottom tap of potentiometer 53.

In the specific case depicted in FIG. 8, the electric signal is obtained from the geophone, is amplified by amplifier 50 and is connected to filters 46, 47 and 48 by leads 66, 67 and 68, respectively. Filter 46 is a high pass-band filter, filter 47 is an intermediate pass-band filter and filter 48 is a low pass-band filter. As mentioned previously, in seismic exploration, the high frequency seismic signals are attenuated to a greater degree than those of a low frequency. Accordingly, the earlier signals reflected from close underlying interfaces will be characterized by having a greater proportion of higher frequencies than those signals reflected from deeper underlying interfaces. Thus, the desired filter characteristics would be to have a high pass-band filter operative at the earlier portions of a seismic record, an intermediate pass-band operative about the middle portions and a low pass-band operative over a portion near the end of the seismic record.

From an inspection of the arrangement in FIG. 8, it can be seen that at time $T=O$ when the wipers of potentiometers 51, 52 and 53 are at the beginning of their sweep, the combining or mixing voltage obtained across summing resistor 76 will consist of the output of high pass-band filter 46 alone, since the outputs of filters 47 and 48 are held at zero, that is, effectively connected to ground. It can be seen that at time $T/2$ the output voltage obtained across summing resistor 76 will consist of one half the output from filter 46, the full output from filter 47 and one half the output from filter 48. At the end of the sweep of the wipers of potentiometers 51, 52 and 53 when $t=T$, the output voltage obtained across summing resistor 76 will consist of the full output of filter 48 since the outputs of filters 46 and 47 are effectively zero or grounded. The above proportions of the filter outputs are obtained based on the assumption of a linear winding on the potentiometers. Of course, as mentioned in connection with the single potentiometer of the first embodiment, this winding on any one or all of the potentiometers can be non-linear, for example, logarithmic or selected shunting resistors can be employed between the tap points on the potentiometers.

It can be seen that the wipers of potentiometers 51, 52 ond 53 are ganged together and driven by drive motor 91 so that the sweeps thereof are synchronized. The drive motor 59 is synchronized with or may be the same drive motor as is used to drive the recorder. The potentiometers, although shown schematically as the straight variety, can preferably be of the rotary type. The time varying proportions of the output signals of filters 46, 47 and 48 obtained as outputs of the potentiometers 51, 52 and 53, respectively, are combined on a common output lead 92. The combined signal voltage is obtained across summing resistor 76. The common output lead 92 is connected to modulator 93. The output of modulator 93 is connected to a recorder 94 by an electrical lead 95. The recorder may be of the conventional type used in seismic exploration. The combined signal on lead 92 is modulated and applied to the recorder 94 to give a trace in which the signal proportions from predetermined frequency ranges are varied with time to give a time varying filter effect.

In the specific arrangement depicted by FIG. 8, the varying filter effect provides a trace in which more high frequency signals are recorded on a first portion of the record, a combination of high and low frequencies are recorded on a middle portion of the record, and a greater proportion of low frequency than high frequency signals are recorded on a last portion of the record.

Obviously, many modifications and variations of the invention may also be made without departing from the spirit and scope thereof, and, therefore, only such limitations should be imposed as are indicated in the appended claims.

I claim:

1. In a seismic exploration system comprising a source of seismic waves for introducing seismic signals into the earth, at least one receiving station for receiving said seismic signals after travel within the earth, said receiving station including a transducer for converting said received seismic signals into corresponding electric signals, the improvement comprising a plurality of parallel signal channels upon which each of said electric signals from said transducer is impressed, each of said electric signal channels including a filter means having a different predetermined frequency pass-band and adapted to pass said electric signals falling within said predetermined frequency pass-band, combining means for providing a signal which is a combination of the output signals from each of said filter means, said combining means comprising a continuously variable potentiometer connected in each channel for varying the proportions in which the output signals of said filter means are applied to said combining means, automatic drive means for varying said potentiometers in accordance with a predetermined function of time and utilization means for obtaining information from said signal provided by said combining means about the earth through which said seismic signals travel.

2. In a seismic exploration system according to claim 1, wherein said utilization means is a recording means for recording the signal from said combining means to provide a seismic trace in which a time variable frequency filtering effect has been obtained.

3. In a seismic exploration system according to claim 1, wherein each of said variable potentiometers include a winding having a predetermined functional variation along the length thereof.

4. In a seismic exploration system according to claim 3, wherein said winding of each of said variable potentiometers has a linear variation.

5. In a seismic exploration system according to claim 3, wherein said winding of each of said variable potentiometers has a logarithmic variation.

6. In a seismic exploration system comprising a source of seismic waves for introducing seismic signals into the earth, at least one receiving station for receiving said seismic signals after travel within the earth, said receiving station including a transducer for converting said received seismic signals into corresponding electric signals, the improvement comprising a plurality of parallel signal channels upon which each of said electric signals from said transducer is impressed, each of said signal channels including a filter means having a different predetermined frequency pass-band and adapted to pass said electric signals falling within said predetermined frequency pass-band, combining means for providing a signal which is a combination of the output signals from each of said filter means, said combining means comprising a continuously variable potentiometer connected in each channel for varying the proportions in which the output signals of said filter means are applied to said combining means, automatic drive means for varying said potentiometers in accordance with a predetermined function of time variable resistance means connected between a common reference potential and the end of each of said potentiometers for introducing a resistance that can be individually preset within a range effectively extending from a lowest value to a highest value thereby providing a further control of the proportions in which said electric signals are combined.

7. In a seismic exploration system according to claim 1, wherein each of said continuously variable potentiometers has a number of tap positions thereon, any one of which may be preselected so as to connect the outputs of the respective filter means thereto and provide a further control over the proportions with respect to time in which the output signals of said filter means are applied to said combining means.

8. In a seismic exploration system comprising a source of seismic waves for introducing seismic signals into the earth, at least one receiving station for receiving said seismic signals after travel within the earth, said receiving station including a transducer for converting said received seismic signals into corresponding electric signals, the improvement comprising a first and second signal channel upon which said electric signals from said transducer are impressed, said first and second channels each including a filter means having a different predetermined frequency pass-band and adapted to pass said electric signals falling within said respective frequency pass-band, combining means for providing a signal which is a combination of the output signals from each of said filter means, said combining means comprising a continuously variable potentiometer having the ends thereof connected to said respective channels for varying the proportions in which the output signals of both said filter means are applied to said combining means, automatic drive means for varying the wiper of said potentiometer in accordance with a predetermined function of time and recording means for making a trace of said signals from said combining means wherein said signal variations representing received seismic signals falling within the frequency range being passed in greatest proportion are clearly distinguishable.

9. In a seismic exploration system according to claim 8, said potentiometer includes a linearly varying winding and said drive means for varying said wiper along said potentiometer is a drive motor whose speed is adjusted in accordance with the speed of the seismic record being produced.

10. In a seismic exploration system comprising a source of seismic waves for introducing seismic signals into the earth, at least one receiving station for receiving said seismic signal after travel within the earth, said receiving station including a transducer for converting said received seismic signals into corresponding electric signals, the improvement comprising first and second signal channels upon which each of said electric signals from said transducer is impressed, each of said first and second signal channels including a filter means having a different predetermined pass-band, one of said filter means being adjusted to pass electric signals having a frequency lying in the low-frequency pass-band and the other of said filter means being adjusted to pass electric signals having a frequency lying in the high-frequency pass-band, means for combining the output signals from said low-frequency pass-band filter means and said high-frequency pass-band filter means, said combining means comprising a continuously variable potentiometer having the ends thereof connected to said respective channels for varying the proportions in which the output signals of both said filter means are applied to said combining means, automatic drive means for varying the wiper of said potentiometer in accordance with a predetermined function of time and recording means for making a trace of said signals from said combining means wherein the signal recorded varies in frequency as a function of time.

11. An electric signal processing system comprising in combination a source of electric signals corresponding to the signal outputs from a seismic receiving station in response to seismic waves traveling through the earth to said receiving station from a shot point in the earth, a plurality of parallel signal channels upon which each of said electric signals from said source is impressed, each of said electric signal channels including a filter means having a different predetermined frequency pass-band and adapted to pass said electric signals falling within said predetermined frequency pass-band, combining means for providing a signal which is a combination of the output signals from each of said filter means, said combining means comprising a continuously variable potentiometer connected in each channel for varying the proportions in which the output signals of said filter means are applied to said combining means, automatic drive means for varying said potentiometers in accordance with a predetermined function of time and utilization means for obtaining information from said signal provided by said combining means about the earth through which said seismic signals travel.

References Cited by the Examiner

UNITED STATES PATENTS

| | | | |
|---|---|---|---|
| 2,492,062 | 12/1949 | Potter | 181—.5 |
| 2,558,868 | 7/1951 | McCarty | 340—15.5 |
| 2,961,613 | 11/1960 | Eschner. | |
| 3,063,034 | 11/1962 | Lee | 340—15.5 |
| 3,088,094 | 4/1963 | Heintz et al. | 340—15.5 |
| 3,137,363 | 6/1964 | Wolf | 181—.5 |
| 3,142,815 | 7/1964 | Picou | 340—15.5 |

BENJAMIN A. BORCHELT, *Primary Examiner.*

R. M. SKOLNIK, *Assistant Examiner.*